United States Patent [19]

Shaw et al.

[11] Patent Number: 5,453,255

[45] Date of Patent: Sep. 26, 1995

[54] HIGH TEMPERATURE HANGING SYSTEM FOR FLUID SOLID CYCLONE/PLENUM SYSTEMS

[75] Inventors: Donald F. Shaw, Denville, N.J.; John F. Socolofsky, Sriracha, THX

[73] Assignee: Exxon Research & Engineering Co., Florham Park, N.J.

[21] Appl. No.: 265,165

[22] Filed: Jun. 24, 1994

[51] Int. Cl.[6] .................................................... F27B 15/14
[52] U.S. Cl. ............................. 422/147; 55/349; 248/901
[58] Field of Search ....................... 422/147, 144, 422/145, 220, 223; 248/317, 901; 55/345, 346, 349, 459.1

[56] References Cited

U.S. PATENT DOCUMENTS

| | | | |
|---|---|---|---|
| 2,904,410 | 9/1959 | Traue | 422/145 |
| 3,333,402 | 8/1967 | Kalen | 55/345 |
| 3,460,785 | 8/1969 | Abidi | 248/694 |
| 3,616,449 | 10/1971 | Pellegrin | 204/298.14 |
| 3,785,782 | 1/1974 | Cartmell | 422/147 X |
| 3,951,629 | 4/1976 | Kalen | 55/349 |
| 3,955,950 | 5/1976 | Miller, Jr. | 55/459.1 |
| 3,982,902 | 9/1976 | Lortz | 422/147 |
| 4,070,826 | 1/1978 | Stenger et al. | 60/748 |
| 4,088,568 | 5/1938 | Schwartz | 208/121 |
| 4,273,565 | 6/1981 | Worley | 422/147 X |
| 4,287,158 | 9/1981 | Roots | 422/241 |
| 4,408,107 | 10/1983 | Sakuma et al. | 200/144 B |
| 4,547,341 | 10/1985 | Weber | 422/147 |
| 4,666,675 | 5/1987 | Parker et al. | 422/147 |
| 4,728,348 | 3/1988 | Nelson et al. | 55/345 |
| 4,778,660 | 10/1988 | Haddad et al. | 422/144 |
| 5,221,301 | 6/1993 | Giuricich | 422/147 X |

Primary Examiner—Robert J. Warden
Assistant Examiner—Robert Carpenter
Attorney, Agent, or Firm—Joseph J. Dvorak

[57] ABSTRACT

Each of a plurality of cyclones is suspended from the roof of a vessel by means of tubular extensions of their barrels. These tubular extensions are slotted lengthwise to minimize thermal stresses in the vessel head. Importantly, this hanging scheme provides a direct extension within the load path for the cyclone weight, thus supporting the cyclone in tension stresses rather than high bending stresses.

3 Claims, 1 Drawing Sheet

HIGH TEMPERATURE HANGING SYSTEM FOR FLUID SOLID CYCLONE/PLENUM SYSTEMS

FIELD OF THE INVENTION

The present invention relates generally to improvements in vessels employed in fluid solid processes such as catalyst regenerator vessels and the like. More particularly, the present invention relates to improvements in supporting cyclone separators in such vessels.

BACKGROUND OF THE INVENTION

There are a number of commercially known fluid solid processes which are conducted at high temperatures and which require removal of particulates from fluent gas streams. A representative example of such processes is the fluidized catalytic cracking of petroleum feedstocks. Fluidized catalytic cracking units employ both a reactor vessel and a catalyst regenerator vessel, each of which include cyclones for the recovery of catalyst particles from the gases emanating from these vessels.

Various types of cyclone supports and guides have been adapted for supporting the cyclones internally within the vessel. Many of these supports and guides are designed in an attempt to compensate for differential expansion between the various interconnected equipment within the vessel.

Notwithstanding the numerous techniques used to suspend cyclones in vessels, there still remains a need for improved techniques for suspending such cyclones, particularly for elevated temperatures where allowable stresses are quite low due to creep. Thus, it is an object of the present invention to provide an improved design for hanging cyclones inside vessels. It is also an object of the present invention to provide a cyclone plenum system with each cyclone and the plenum being self supporting. These and other objects of the present invention will be better understood upon a reading of the description which follows.

SUMMARY OF THE INVENTION

Very simply, in accordance with the present invention, each of a plurality of cyclones is suspended from the roof of a vessel by means of tubular extensions of their barrels. These tubular extensions are slotted lengthwise to minimize thermal stresses in the vessel head. Importantly, this hanging scheme provides a direct extension within the load path for the cyclone weight, thus supporting the cyclone in tension stresses rather than high bending stresses.

In another embodiment of the present invention, the plenum chamber within the vessel is constructed of two ellipsoidal heads with a short straight side and is suspended from the top head of the plenum chamber by its gas outlet tube, thereby providing a non-linear load path for the plenum chamber. Thus, both the cyclones and the plenum chamber in the vessel of the present invention are self supporting.

These and other features of the present invention will be better understood upon a reading of the "Detailed Description" in light of the accompanying drawings.

DETAILED DESCRIPTION OF THE INVENTION

Figure 1:
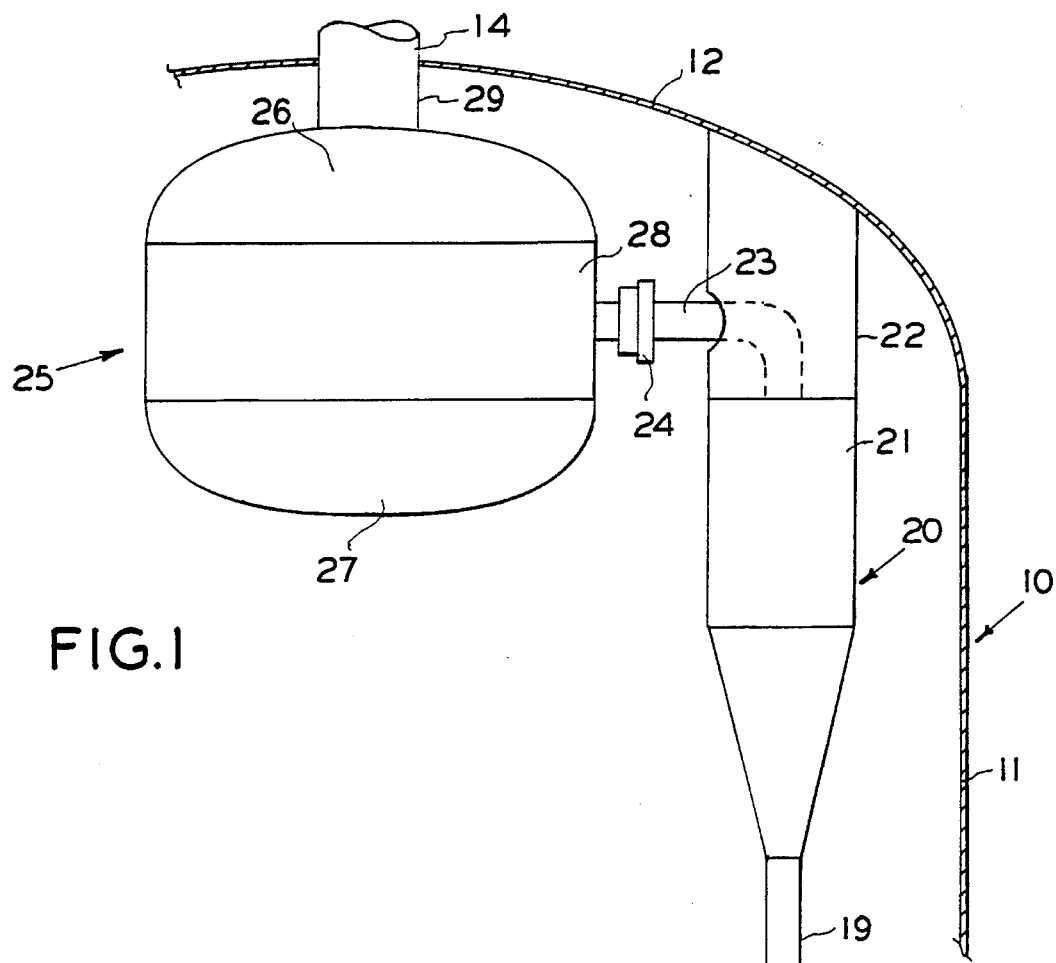
FIG. 1 is a fragmentary schematic view in side elevation showing a cyclone supported according to the invention and a plenum separately supported in accordance with the present invention.

Referring to FIG. 1, the reference numeral 10 designates generally a vessel such as a catalytic cracking reactor or regenerator. Mounted within the vessel are a plurality of cyclones, one of which is shown on cyclone 20, and internal plenum 25.

The vessel 10 has a generally cylindrical wall 11 and a dome or sloped roof 12. Included in the roof 12 of the vessel 10 is an outlet conduit 14.

As can be seen in FIG. 1, the internal plenum 25 has top and bottom ellipsoid heads 26 and 27, respectively, and a relatively short side wall 28. Centrally located within top head 26 of plenum 25 is an outlet tube 29 which is in communication with outlet 14 of vessel 10. Importantly, tube 29 will have substantially the same diameter as that of outlet 14 and, even more importantly, tube 29 is the means by which the internal plenum 25 is suspended within vessel 10.

Each of the plurality of cyclones in the vessel is suspended as described in connection with cyclone 20. As shown, cyclone 20 is suspended from the vessel head 12 by means of a tubular extension 22 of the cyclone barrel 21. Thus the diameter of tubular extension 22 is the same as the outer diameter of the cyclone barrel 21. The tube 22 extends from the barrel 21 to the vessel roof 12. Also, the tubular extension 22 has an opening in its side wall through which the cyclone outlet 23 pipe extends to communicate with an inlet opening in the side wall 28 of plenum 25 as shown. Typically, the height of side wall 28 is from about 1½ to about 3 times the diameter of cyclone outlet pipe 23. Thus, the height of side wall 28 is greater than the diameter of cyclone outlet pipe 23. Alternatively, with some cyclones, the cyclone outlet pipe 23 may extend through the opening in the tubular extension 22 to communicate with the inlet of another cyclone (not shown). Preferably, cyclone outlet pipe 23 is provided with an expansion joint 24 substantially at the point of connection with the internal plenum side wall 28. This expansion joint 24 eliminates any thermal stresses associated with differential movement between cyclone 20 and plenum 25.

Each cyclone 20, of course, may be provided with braces (not shown) for dipleg 19 of the cyclone 20.

Figure 2:
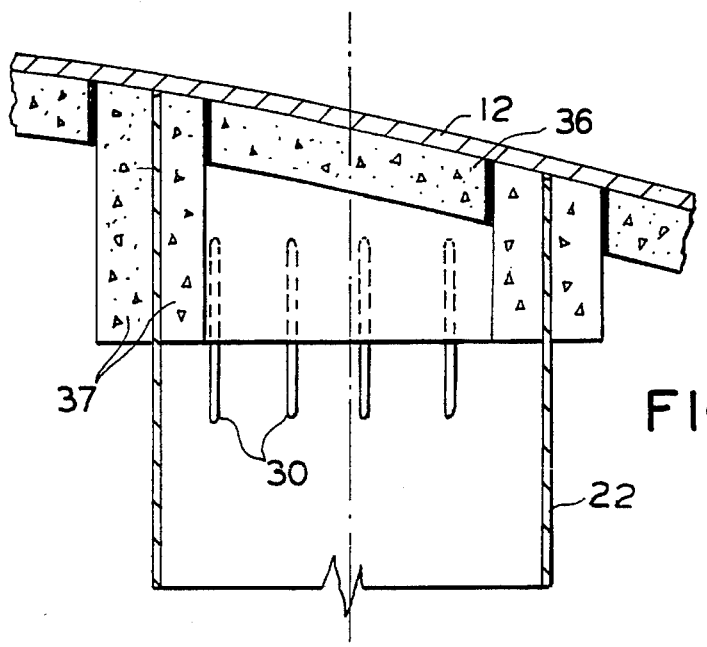
FIG. 2 is an enlarged fragmentary view of the cyclone support of the present invention.

Turning now to FIG. 2, the cyclone barrel extension hanger tube 22 is fixed to the vessel head 12, for example, by welding or similar means. Importantly, the tubular barrel extension 22 is provided with a plurality of lengthwise slots 30 spaced around the circumference of the tubular member 22 which minimize normal stresses. Typically, the slots 30 will range from about $\frac{1}{16}$ of an inch to about $\frac{1}{4}$ of an inch wide and the length of slots 30 will depend upon the thickness of the tubular member 22 and its radius. Preferably, the length, L, of slots 30 will be given by the equation $L = 3\sqrt{Rt}$ where R is the outer radius of tubular member 22 and t is the thickness of 22.

Typically, the vessel 10 will have an internal refractory lining such as refractory lining 36 shown on the internal surface of the vessel head 12. Optionally and preferably, the top portion of the tubular extension 22 will also have on both its internal and external surface refractory lining 37 which, of course, will be of the same material as refractory lining 36.

As will be readily appreciated from the foregoing, each cyclone within the vessel and the plenum are self supporting. Moreover, a straight load path is used for suspending each cyclone and the plenum. Thus, the invention provides a support system with fewer areas of high local stresses. These and other advantages of the present invention will be readily apparent to those skilled in the art.

The present invention, of course, can be embodied in other specific forms without departing from the spirit and scope of the invention, as defined by the appended claims.

What is claimed is:

1. An apparatus for supporting a cyclone separator within a high temperature vessel, the apparatus comprising:
   a cyclone separator having a cyclone barrel
   a vessel having a vessel roof; and
   a cylindrical tube extending from the cyclone barrel to the vessel roof, the cylindrical tube having substantially the same diameter as the cyclone barrel, the cylindrical tube being attached to the vessel roof and the cyclone barrel for support of the cyclone, and the cylindrical tube having a plurality of lengthwise slots equally spaced around the periphery of the tube.

2. In a high temperature vessel having an outer cylindrical shell, a sloped roof with an outlet conduit in the roof, and a plurality of cyclones each having a barrel and an outlet conduit positioned within the vessel and suspended therein, the improvement comprising:
   a tubular member extending from the cyclone barrel of the vessel roof for suspending the cyclone within the vessel, the tubular member having a diameter substantially the same as the diameter of the barrel, the tubular member including a plurality of lengthwise slots substantially equally spaced around the periphery thereof, and an opening therein for passage therethrough of the outlet conduit of the cyclone.

3. The improvement of claim 2 further comprising a plenum having an ellipsoidal top and bottom head and a straight side, the top head having an outlet conduit suspending the plenum in the vessel and communicating with the outlet conduit in the roof of the vessel, the plenum side wall having a plurality of openings therein for communicating with the cyclone outlets.

* * * * *